UNITED STATES PATENT OFFICE.

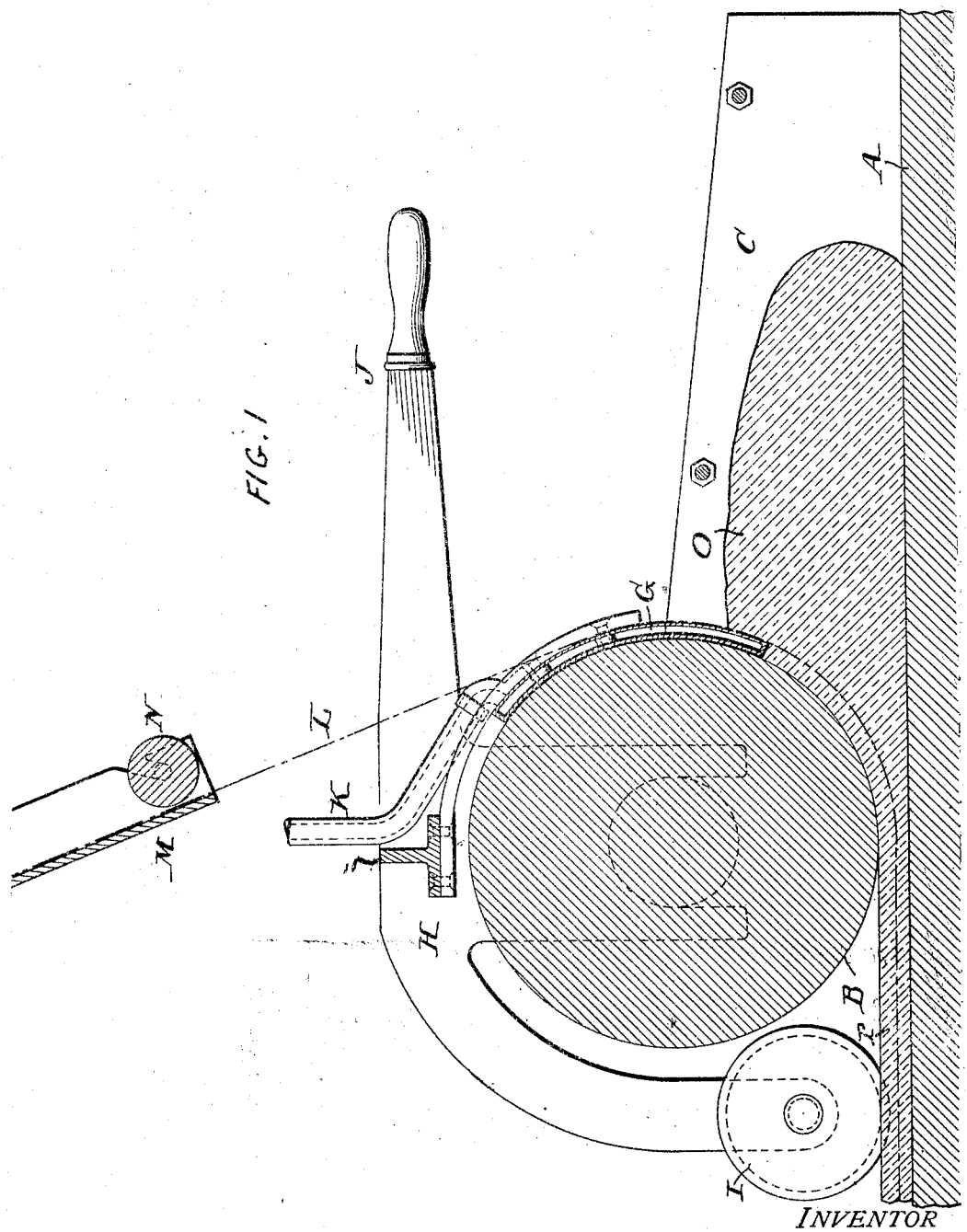

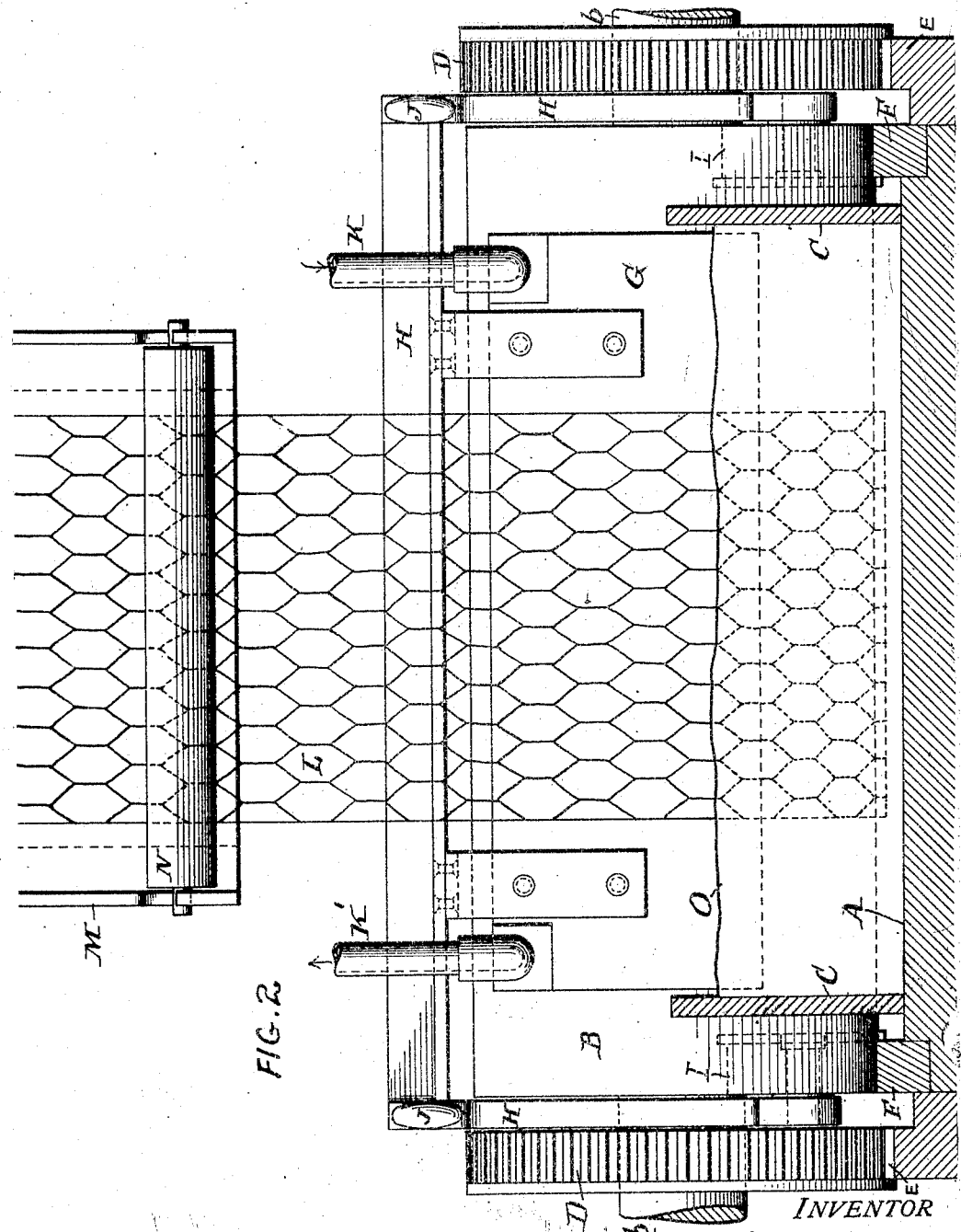

ARNO SHUMAN, OF CONNELLSVILLE, PENNSYLVANIA, ASSIGNOR TO THE CONTINUOUS GLASS PRESS COMPANY, A CORPORATION OF NEW JERSEY.

METHOD AND MACHINE FOR MAKING WIRE-GLASS.

No. 868,713.   Specification of Letters Patent.   Patented Oct. 22, 1907.

Application filed February 26, 1906. Serial No. 302,911.

*To all whom it may concern:*

Be it known that I, ARNO SHUMAN, of Connellsville, county of Fayette, State of Pennsylvania, have invented an Improvement in Methods and Machines for Making Wire-Glass, of which the following is a specification.

My invention has reference to the manufacture of wire glass and machines therefor, and consists of certain improvements which are fully set forth in the following specification and shown in the accompanying drawings which form a part thereof.

The object of my invention is to provide a method and means for making wire glass in a simple and expeditious manner, and in which the wire netting will be wholly covered with glass and be definitely positioned between the surfaces of the glass sheet.

In carrying out my invention I employ the usual table, gun and flattening roller, and combine therewith a hollow guide plate for the wire netting, preferably curved, and adapted to be adjusted vertically to and from the table but with its lower guide edge continually in contact with or very close to the surface of the roller, whereby it may be adjusted into contact with or maintained very close to the molten glass being rolled and into which the wire netting is fed, and means for supplying the hollow guide plate with a cooling medium. In the operation of said mechanism, the rolling of the glass is done in the usual manner, but the wire netting is delivered directly into the glass at a short distance from the roller and is supported where it comes into first contact with the said glass and this support is adjusted downward about the surface of the flattening roller to compensate for the gradual diminution in the body and height of the glass mass.

My invention also comprehends details of construction which, together with the above features will be better understood by reference to the drawings, in which:—

Figure 1 is a longitudinal sectional view of a wire glass machine embodying my invention; and Fig. 2 is a cross section of the same taken through the table and gun.

A is the table and is provided with the usual trangs F, F, and racks E, E.
B is the usual flattening roller which runs upon the trangs and is provided with gears D, D, meshing with the racks of the table.

C is the gun which rests upon the table and is propelled forward by the flattening roller.
The apparatus thus described is adapted for rolling a ball of glass O down into a sheet P.

To introduce the meshed wire or netting, I provide the following construction. A curved hollow plate G is fitted to the forward and upper part of the curved surface of the flattening roller B as shown and this plate is kept cool by a cooling medium such as water which is admitted by pipe K to the hollow plate and escapes by pipe K'. These pipes are arranged respectively upon the opposite sides of the curved plate G, so that the water is required to flow throughout the interior of the plate. It is preferable that the water be forced into the plate G under pressure sufficient to prevent the generation of steam within the curved hollow plate. This plate G is secured to a frame H which, in the form shown, is pivoted upon the shaft or axles b b of the flattening roller B so that the plate G is, in effect, pivoted concentrically to the axis of the roller and its forward and lower edge is maintained in contact with or very close to the surface of the roller at all times of its adjustment. This frame H is provided at the rear with arms to which are journaled the guide rollers I, I, which run upon the trangs F F and thereby insures to the hollow plate, a normally definite position with respect to the roller B, as shown in Fig. 1 and prevent abnormal rising of it. The frame H is also provided with handles J J by which it may be oscillated to lower the hollow curved guide plate G to maintain it in contact with or very close to the gradually diminishing ball of glass O during the rolling operation. The thickness of the lower end of the curved plate G is equal to approximately one half the thickness of the glass to be rolled.

The wire netting L is guided through a hopper or frame M which may be arranged above the flattening roller and adjusted over the table to follow the roller in any suitable manner; and a tension may be put upon the netting by a tension roller N which rests against the descending netting L and by its own weight or otherwise applies a pressure against the said netting. The lower end of the netting L is guided over the hollow curved guide plate G and thence into the body of the glass as shown in Fig. 1.

The operation will now be understood and is as follows: The molten glass is dumped upon the table in front of the flattening roller, the wire netting is lowered so that its lower edge extends down into the glass, and the flattening roller is then advanced. The glass becomes rolled down into a sheet P with the wire netting embedded in it as shown. As the wire netting is supported away from the surface of the roller B by the thickness of the lower edge of the guide plate G, it is evident that the glass will flow through the meshes thereof and cause the netting to be embedded or completely inclosed in glass and at the proper distance from the roller B. This insures the netting being centrally located in the completed sheet P. By having the lower edge of the guide plate G in contact with or close to the molten glass, it is evident that it supports the netting until the glass has passed through the meshes. The lower edge of the plate G should either be in contact with or not more than about one-eighth of an inch from the molten glass and to insure this condition, the frame H is oscillated and the plate G lowered so as to keep the lower edge in said relation to the glass as the rolling proceeds and the mass of glass gradually becomes less.
By keeping the plate G cool the glass does not stick to it and the wire netting is maintained in a comparatively cool condition when it enters the glass so that it remains bright and clean.

It is evident that while the plate G is shown in its preferred form as curved, it is not necessary that it shall be curved, as the essential feature resides in having the lower guide edge maintained so as to hold the netting at a definite distance from the roller B when it enters the glass and also in having capacity for adjustment downward while maintaining the same axial relation to the said roller.

While I prefer the construction shown as being excellently adapted for the purposes of my invention, I do not confine myself to the details as these may be modified in various ways without departing from the spirit of the invention.

Having now described my invention, what I claim as new and desire to secure by Letters Patent, is:

1. The method of making wire glass, which consists in rolling down a mass of molten glass into a sheet and during said operation feeding into the upper surface of the glass close to the roller a wire netting and supporting said wire netting away from the roller at a point close to or in contact with the glass where the netting enters it, and gradually lowering said support for the wire netting as the mass of molten glass becomes reduced and at the same time advancing the support forward in a horizontal direction with a speed equal to that of the roller, whereby the molten glass is caused to flow through the meshes of the netting adjacent to its support and under the advancing pressure due to the roller and netting support.

2. In a machine for making wire glass, the combination of the table and flattening roller, with a hollow guide arranged in front of and close to the roller and having a guide face upon its side most distant from the roller and over which the wire netting is guided into the glass while being mechanically held away from the roller, and means for supplying the hollow guide with a cooling medium.

3. In a machine for making wire glass, the combination of the table and flattening roller, with a hollow guide arranged in front of and close to the roller and over which the wire netting is guided into the glass, means for adjusting the said hollow guide concentrically downward about the forward surface of the roller during the rolling operation, and means for supplying the hollow guide with a cooling medium.

4. In a machine for making wire glass, the combination of the table and flattening roller, with a hollow guide arranged in front of and close to the roller and over which the wire netting is guided into the glass, and means for adjusting the said hollow guide concentrically downward about the forward surface of the roller during the rolling operation.

5. In a machine for rolling wire glass, the table and flattening roller, in combination with a frame pivoted concentrically to the flattening roller, and a hollow water cooled guide plate carried by the frame so as to guide the wire netting and have capacity for vertical adjustment.

6. In a machine for rolling wire glass, the table and flattening roller, in combination with a frame pivoted concentrically to the flattening roller, a hollow water cooled guide plate carried by the frame so as to guide the wire netting and have capacity for vertical adjustment, and means for guiding the netting to the guide consisting of a hopper M and tension roller N.

7. In a machine for rolling wire glass, the table and flattening roller, in combination with a frame pivoted concentrically to the flattening roller and having rear guide rollers I I to prevent backward rotation, and a hollow water cooled guide plate carried by the frame so as to guide the wire netting and have capacity for vertical adjustment.

8. In a machine for rolling wire glass, the table and flattening roller, in combination with a frame pivoted concentrically with respect to the roller and movable forward with it, and a wire netting guide carried by the frame adjacent to the front and upper surface of the roller and adjustable vertically whereby it may be maintained in contact with or very close to the upper surface of the molten glass close to the roller during the rolling operation.

9. In a machine for rolling wire glass, the table and flattening roller, in combination with a frame pivoted concentrically with respect to the roller and movable forward with it and having means to limit its movement in one direction only, and a water cooled wire netting guide carried by the frame adjacent to the front and upper surface of the roller and adjustable vertically whereby it may be maintained in contact with or very close to the upper surface of the molten glass close to the roller during the rolling operation.

10. In a machine for rolling wire glass, the table and flattening roller, combined with a hollow guide plate for the wire netting having its lower guide edge arranged close to the front surface of the flattening roller and by which the wire netting is fed into the glass in advance of the roller, means for adjusting the hollow guide plate downward during the rolling operation whereby it may be kept in contact with or very close to the upper surface of the gradually receding glass close to the roller, and means for circulating a cooling medium through the hollow guide plate.

In testimony of which invention, I hereunto set my hand.

ARNO SHUMAN.

Witnesses:
C. L. HIGHBERGER,
M. D. WILLIAMS.